Figure 1:
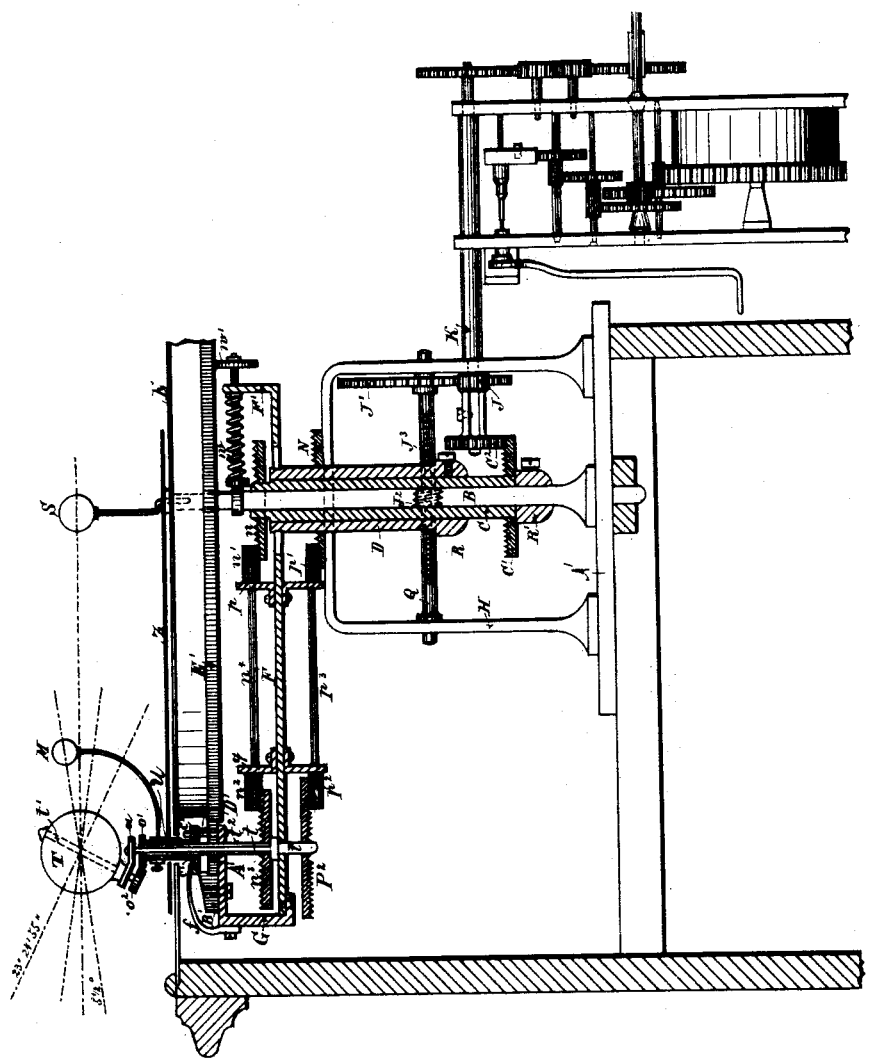

(No Model.)
2 Sheets—Sheet 1.

L. DEICHMANN.
TELLURIAN.

No. 402,005.
Patented Apr. 23, 1889.

Witnesses:
J. A. Hundly
Oscar Haase

Inventor:
Louis Deichmann
By G. Bury.
Attorney

UNITED STATES PATENT OFFICE.

LOUIS DEICHMANN, OF CASSEL, GERMANY.

TELLURIAN.

SPECIFICATION forming part of Letters Patent No. 402,005, dated April 23, 1889.

Application filed September 18, 1888. Serial No. 285,762. (No model.) Patented in Germany June 28, 1887, No. 43,274; in France August 31, 1887, No. 185,592, and in Belgium February 6, 1888, No. 80,533.

*To all whom it may concern:*

Be it known that I, LOUIS DEICHMANN, a citizen of Germany, residing at Cassel, in Germany, have invented certain new and useful Improvements in Astronomical Apparatus, (for which the following foreign patents have been obtained: France, Patent No. 185,592, dated 31st of August, 1887; Germany, Patent No. 43,274, dated June 28, 1887, and Belgium, Patent No. 80,533, dated February 6, 1888,) of which the following is a description.

My invention relates to an apparatus for indicating the rotation and movements of the globes or spheres of the planetary system. Such apparatuses are generally known under the names of "tellurium," "planetarium," and "lunarium."

The improved instrument constituting the invention consists of a clock mechanism by which motion is communicated from the said mechanism and an astronomical dial and index. The casing, which may be of wood, metal, or other suitable material, contains the clock-work, which must be wound up at intervals and may or may not be provided with a striking arrangement and with a dial indicating hours, minutes, and seconds, the said clock-work being otherwise of any ordinary reliable construction.

In the drawings, Figure 1 represents a vertical section in which is shown the principal features of my invention. Fig. 2 repesents a plan view of the dial.

The apparatus by which movement is transmitted from the clock-work consists of a metal base-plate, A', into which a vertical spindle, B, is stepped or screwed, the said spindle having around it two loose sleeves or spindles, C D, one of which is within the other. The upper end of the spindle B is screwed into an elliptical disk, E', the periphery or boundary of which represents the elliptical orbit of the earth, and the said spindle also supports the sun-globe S on a vertically-projecting axis or rod which is so cranked as to indicate the eccentric positions of the sun to the center of the whole system. The sleeves C D are supported by adjustable collars R R', one of which is fixed by a set-pin to the shaft B and the other to the sleeve C'. A portion of the upper end of the sleeve D supports the arm F in such a manner that the arm may be shifted right and left a distance equal to the difference of the longer and the shorter radius of the elliptical orbit of the earth. The long arm of the arm F carries an upturned bracket, G, which supports a spur-wheel, A, the latter being geared by a pin, D', with a sleeve, C³, which carries and operates the moon-globe M. The bracket G also serves to support and guide shaft $t$ and sleeve $t^2$, one of which is hollow and passes over the other, both being carried by the arm F. The upper end of the inner shaft has a cranked arm or disk; $a$, secured to it, the bent or inclined part of the said arm or disk lying at an angle of twenty-three and one-half degrees to the horizontal part, and in the said inclined part and at right angles thereto there is secured a rod or axis, $t'$, which so supports the earth-globe T that the earth-axis is truly inclined to the elliptic orbit of the earth.

The short arm F' of the arm F is bent up at right angles and supports a spindle carrying the helical spring $w$, fixed at one end to the center shaft, B, while its other end presses against the upturned end of the lever, and so causes the pinion A to be pressed against the toothed circumference of the elliptical disk E'. The helical spring $w$ is carried on a rod one end of which is supported by the shaft B and its other end by the arm F, and on the projecting end of the said rod a small wheel or roller, $w'$, is secured, which wheel, bearing on the under side of the elliptical disk E', serves to keep the arm F always parallel to the said disk.

The motion of the parts hereinbefore described is effected as follows:

*Rotation of the earth on its own axis.*— From the clock-work there extends a horizontal transmission-shaft, K, which makes one revolution in twelve hours. The said shaft K rests in bracket H and has at its inner end a spur-wheel, C², geared with a wheel, C', secured on the sleeve C. The wheel C' has twice as many teeth as the crown-wheel C², and therefore makes one revolution for every two of the latter wheel, one revolution of the larger wheel, C', being consequently equal to twenty-four hours—that is, to one sidereal day. On the upper end of the sleeve C another horizontal toothed wheel is secured, and a like wheel, $n^3$, is fixed on the sleeve $t^2$, the crown-wheels $n$ and $n^3$ being of equal size with the wheel C'. The upper end of the shaft $t$ has a small spur-wheel, $o'$, upon its gearing, with a spur-wheel, $o^2$, secured on the earth's axis $t'$. Motion is transmitted from the center shaft, B, to the earth's axis $t'$ through a shaft, $n^4$, carried in bearings $q$ and $p$, secured to the horizontal arm F, pinions $n'$ $n^2$, gearing, respectively, with the wheels $n$ $n^3$, being secured on the shaft $n^4$. By this arrangement of gearing earth is caused to make one revolution in twenty-four hours on its own axis from right to left, and the gear follows the elliptical motion of the lever F, the pinion $n'$ sliding backward and forward in the teeth of the wheel $n$.

*Motions of the earth round the sun.*—The transmission-shaft K has a second spur-wheel, J, with twelve teeth, geared with a spur-wheel, J', of six times its diameter—*i. e.*, with seventy-two teeth—so that the wheel J, making with the shaft K one revolution in twelve hours, the large wheel J' will make a revolution in six times twelve hours—that is, in three sidereal days. The spur-wheel J' is carried on a shaft, Q, revolving in the bracket H, and the said shaft also carries a worm, $J^2$, which gears with a worm-wheel, $J^3$, with one hundred and twenty-two teeth, fixed to the lower end of the sleeve D. By the rotation of the worm the worm-wheel $J^3$ is rotated one tooth in three sidereal days—that is to say, it makes a complete rotation in three hundred and sixty-six sidereal days, or in a tropical leap year. The sleeve D therefore makes one revolution with the arm F, carrying the earth and the moon, in course of one year, in a direction from right to left, round the sun. The helical spring $w$ at the end F' of the arm F causes the wheel A on the sleeve $t^2$ to be kept in gear with the pinion of the elliptical disk E', so as to maintain the elliptical orbit of the earth secured on the double shaft $t\ t'$. It will be observed that the upper end of sleeve D is flattened and passes through a slot in the arm F. During medium tropical time—that is, excepting in leap years—the whole mechanism must be put forward twenty-four hours after having passed the 28th day of February, in order that the positions may be precisely indicated.

*Maintenance of proper inclination of the earth's axis to the plane of its orbit.*—The proper inclinations of the earth's axis—namely, twenty-three and one-half degrees to a line perpendicular to the plane of the orbit—is maintained by mechanism fixed to the top of the bracket H and independent of the center shaft. The said wheel has geared with it a pinion, $p'$, secured on a shaft, $p^3$, which also carries another pinion, $p^2$, geared with a wheel, $P^2$, on the lower end of the shaft $t$, which carries on its upper end the inclined arm or disk $a$, supporting the earth's axis. The teeth of the wheel N are on its upper and those of the wheel $P^2$ on its lower face. This gear is by the spring $w$ also caused to follow the elliptical motion of the arm F, the teeth of the pinion $p'$ sliding backward and forward in the teeth of the fixed wheel N, and as the lever moves in a direction of from right to left around the center shaft, B, the said gearing transmits rotary motion in the opposite direction to the elliptic arm or disk $a$ and to the earth globe, whereby the inclination of the earth's axis to the plane of the earth's orbit is maintained unchanged.

*Motion of the moon around its axis and around the earth.*—The tooth-wheel A, supported loosely on the sleeve $t^2$, makes one revolution in twenty-nine and one-half days, and the said wheel being geared by the pin D' with the collar or sleeve $C^3$, which is not affected by the elliptical disk E', the said collar causes the moon to rotate on its axis and around the earth. The wheel A also gears with a wheel, B', the circumference of which is of such a size it makes one revolution in a direction contrary to wheel A in twenty-seven days, five hours, five minutes, and thirty-six seconds. The upper surface of this wheel has an inclination of five and one-half degrees, (equal to the inclination of the moon's orbit to the orbit of the earth,) and on this inclined surface the lower face of the collar or sleeve $C^3$ is pressed downward by the spring $f$. One revolution of the wheel A therefore causes a revolution of the moon on its axis and around the earth in twenty-nine days, twelve hours, forty-four minutes, and three seconds, (which is equal to one synodical month,) while the wheel B' causes the moon to rise and sink five and one-half degrees in twenty-seven days, five hours, five minutes, and thirty-six seconds, (equal to one dragon month.)

The nodes of the moon course advance by equal intervals in a direction from east to west and effect the changes in eclipses.

The improved astronomical indicator consists of a dial whose outline exactly corresponds to the earth's orbit and whose surface is divided from the center to the circumference into, first, division of the ecliptic into three hundred and sixty degrees; second, division of the calendar into three hundred and sixty-six days; third, division into twelve months; fourth, the twelve signs of the zodiac in pictures and astronomical signs.

The inner part of the dial represents the courses of the planets Venus and Mercury; also, the center of the system and the eccentric position of the sun and the seasons of the year in succession are or may be distinguished by shading indicated with graphic and mathematical correctness.

The earth and moon globes or spheres above the dial are of proportionate size to each other, and the sun-globe (which is equal to one hundred and eleven diameters of the earth) is represented in size as it appears by observation from the medium distance of the earth. The sun can also be represented by a light.

Above the dial there is a pointer, Z, fixed on the axis B of the sun, and which has a slot at its fulcrum of a length equal to the difference between the major and minor axis. This pointer is also provided with a circular opening at its indicating end and through which the shafts $t\ t^2$ and collar or sleeve $C^3$ pass. In the movement of the earth round the sun the pointer is thus caused to travel with it and indicate through its opening on the scale the degree of the elliptic division, also with its point the calendar days, months, and sign of the zodiac which the earth passes on its course round the sun.

I claim—

1. The combination consisting of the clock mechanism, the rotary shaft K, pinion J, gear-wheel J′, toothed wheel $C^2$, crown-wheel C′, sleeve C, rotary shaft B, crown-wheel $n$, pinion $n'$, support or journal $p$, arbor or shaft $n^4$, support or journal $q$, pinion $n^2$, crown-wheel $n^3$, sleeve $t^2$, sleeve $u$, spring $f$, support G, and the spheres M and S, helical spring $w$, wheel $w'$, and arm F′, and collar R′, substantially as shown and described.

2. The combination consisting of the clock mechanism, the shaft K, pinion J, wheel J′, worm $J^2$, worm-wheel $J^3$, sleeve D, crown-wheel N, pinion $p'$, arbor or shaft $p^3$, pinion $p^2$, crown-wheel $P^2$, shaft $t$, and wheels $a$, sphere T, and axis $t'$, wheels $o'\ o^2$, elliptical disk E′, the indicator Z, dial E, and collar R, substantially as shown and described.

3. The combination consisting of the clock mechanism, the rotary shaft K, gear-wheels J J′, pinion $C^2$, crown-wheel C′, shaft B, worm and wheel $J^2\ J^3$, sleeves C D, crown-wheels N $n$, pinions $n'\ p'$, shafts or arbors $n^4\ p^3$, arm F, pinions $n^2\ p^2$, crown-wheels $n^3\ P^2$, shaft and sleeve $t\ t^2$, support G, spring $f$, wheels $a\ o'\ o^2$, sleeve $u$, axis $t'$, spheres T M S, indicator Z, dial E, helical spring $w$, shaft Q, and bracket H and plate A′, substantially as shown and described.

In testimony whereof I have affixed my signature in presence of two witnesses.

LOUIS DEICHMANN.

Witnesses:
  G. MILEZENSKI,
  L. MASCHMANN.